US010541900B2

(12) United States Patent
Sadana et al.

(10) Patent No.: US 10,541,900 B2
(45) Date of Patent: Jan. 21, 2020

(54) HIERARCHICAL TIME STAMPING

(71) Applicant: Arista Networks, Inc., Santa Clara, CA (US)

(72) Inventors: Anshul Sadana, Santa Clara, CA (US); Prasanna Parthasarathy, Cupertino, CA (US); Adam James Sweeney, San Jose, CA (US)

(73) Assignee: Arista Networks, Inc., Santa Clara, CA (US)

(*) Notice: Subject to any disclaimer, the term of this patent is extended or adjusted under 35 U.S.C. 154(b) by 432 days.

(21) Appl. No.: 15/012,576

(22) Filed: Feb. 1, 2016

(65) Prior Publication Data

US 2017/0222909 A1   Aug. 3, 2017

(51) Int. Cl.
*H04L 12/26* (2006.01)
*H04L 12/715* (2013.01)

(52) U.S. Cl.
CPC ........ *H04L 43/106* (2013.01); *H04L 43/0852* (2013.01); *H04L 43/0858* (2013.01); *H04L 45/04* (2013.01)

(58) Field of Classification Search
CPC .................................................. H04L 43/08–50
See application file for complete search history.

(56) References Cited

U.S. PATENT DOCUMENTS

| | | | |
|---|---|---|---|
| 6,826,148 B1 * | 11/2004 | Lee ......................... | H04L 45/22 370/230 |
| 7,826,376 B1 * | 11/2010 | Kritov ................. | H04L 43/0858 370/241 |
| 8,386,593 B1 * | 2/2013 | Gao ....................... | H04L 41/085 709/223 |
| 9,054,967 B1 * | 6/2015 | Edsall ................. | H04L 43/0852 |
| 9,094,307 B1 * | 7/2015 | Edsall ................... | H04L 43/028 |
| 9,450,846 B1 * | 9/2016 | Huang ................ | H04L 43/0858 |
| 9,509,585 B1 * | 11/2016 | Daniel ................. | H04L 43/106 |
| 9,614,785 B1 * | 4/2017 | Palmer .................. | H04L 49/109 |
| 9,641,410 B2 * | 5/2017 | Lee ..................... | H04L 43/0852 |
| 9,641,416 B2 * | 5/2017 | Frost ................... | H04L 43/106 |
| 9,729,452 B2 * | 8/2017 | Averi .................... | H04L 47/125 |
| 9,769,044 B1 * | 9/2017 | Cirkovic ............. | H04L 43/0876 |
| 9,769,065 B2 * | 9/2017 | Manghirmalani ...... | H04L 45/38 |
| 9,787,559 B1 * | 10/2017 | Schroeder ............. | H04L 43/067 |
| 9,813,315 B2 * | 11/2017 | Schultz ................. | H04L 43/067 |
| 9,825,835 B2 * | 11/2017 | Leong .................... | H04L 43/10 |
| 9,825,866 B2 * | 11/2017 | Tanaka .................. | H04L 47/125 |
| 2002/0087666 A1 * | 7/2002 | Huffman ........... | H04L 29/12009 709/220 |

(Continued)

*Primary Examiner* — Emmanuel L Moise
*Assistant Examiner* — Julian Chang
(74) *Attorney, Agent, or Firm* — Fountainhead Law Group P.C.

(57) ABSTRACT

Various embodiments are described herein, which provide a network element comprising a network port to receive production network data that is used for purposes other than testing the performance of a network, a data plane coupled to the network port, the data plane including a timing module to append a time stamp to a set of one or more time stamps included within the production network data, and a control plane coupled to the data plane, the control plane including a latency analyzer to analyze the set of one or more time stamps included within the production network data.

24 Claims, 13 Drawing Sheets

(56) References Cited

U.S. PATENT DOCUMENTS

| | | | |
|---|---|---|---|
| 2005/0060403 A1* | 3/2005 | Bernstein | H04L 29/06 709/224 |
| 2005/0169188 A1* | 8/2005 | Cometto | H04L 47/10 370/249 |
| 2005/0220095 A1* | 10/2005 | Narayanan | H04L 63/126 370/389 |
| 2005/0232239 A1* | 10/2005 | Ilnicki | H04L 43/10 370/352 |
| 2006/0031576 A1* | 2/2006 | Canright | H04L 45/00 709/240 |
| 2006/0165003 A1* | 7/2006 | Partridge | H04L 43/10 370/248 |
| 2006/0168070 A1* | 7/2006 | Thompson | G06F 9/542 709/206 |
| 2006/0274760 A1* | 12/2006 | Loher | H04M 3/2236 370/395.52 |
| 2006/0274791 A1* | 12/2006 | Garcia | H04L 43/0864 370/508 |
| 2007/0157155 A1* | 7/2007 | Peters | G06F 8/10 717/100 |
| 2009/0080336 A1* | 3/2009 | Zhang | H04L 43/00 370/248 |
| 2009/0080423 A1* | 3/2009 | Ewing | H04L 1/0014 370/389 |
| 2009/0086645 A1* | 4/2009 | Hedayat | H04L 43/50 370/250 |
| 2009/0122697 A1* | 5/2009 | Madhyasha | H04L 41/12 370/229 |
| 2009/0310485 A1* | 12/2009 | Averi | H04L 45/00 370/232 |
| 2009/0310508 A1* | 12/2009 | Ou | H04L 43/10 370/253 |
| 2010/0008233 A1* | 1/2010 | Ee | H04L 43/50 370/241 |
| 2010/0085878 A1* | 4/2010 | McDade | H04L 41/0631 370/242 |
| 2010/0290343 A1* | 11/2010 | Tanaka | H04L 12/4645 370/235 |
| 2011/0063988 A1* | 3/2011 | Lee | H04L 41/5009 370/252 |
| 2011/0222412 A1* | 9/2011 | Kompella | H04L 45/00 370/241.1 |
| 2012/0236723 A1* | 9/2012 | Duda | H04L 43/0852 370/236 |
| 2012/0311107 A1* | 12/2012 | Van der Merwe | H04L 41/083 709/220 |
| 2013/0010600 A1* | 1/2013 | Jocha | H04L 43/026 370/236.2 |
| 2013/0132560 A1* | 5/2013 | Hudzia | H04L 41/064 709/224 |
| 2013/0242758 A1* | 9/2013 | Vaidya | H04L 43/10 370/248 |
| 2013/0242759 A1* | 9/2013 | Durrani | H04L 43/50 370/248 |
| 2013/0265886 A1* | 10/2013 | Leong | H04L 43/10 370/250 |
| 2013/0322236 A1* | 12/2013 | Bahadur | H04L 12/4633 370/230 |
| 2014/0016474 A1* | 1/2014 | Beheshti-Zavareh | H04L 47/283 370/236 |
| 2014/0211639 A1* | 7/2014 | Matthews | H04L 43/10 370/250 |
| 2014/0269266 A1* | 9/2014 | Filsfils | H04L 43/50 370/228 |
| 2014/0286191 A1* | 9/2014 | Solihin | H04L 49/109 370/254 |
| 2015/0023179 A1* | 1/2015 | Stein | H04L 43/0811 370/241.1 |
| 2015/0149625 A1* | 5/2015 | Piro, Jr. | H04L 43/0858 709/224 |
| 2015/0215177 A1* | 7/2015 | Pietrowicz | H04L 43/106 370/230 |
| 2015/0236933 A1* | 8/2015 | Edsall | H04L 43/0852 370/252 |
| 2015/0256397 A1* | 9/2015 | Agarwal | H04L 41/12 370/254 |
| 2015/0256448 A1* | 9/2015 | Xiao | H04L 45/26 370/235 |
| 2015/0281028 A1* | 10/2015 | Akhter | H04L 43/0858 370/252 |
| 2015/0304066 A1* | 10/2015 | Dutti | H04L 43/0864 398/98 |
| 2016/0072706 A1* | 3/2016 | Huang | G06F 11/2002 709/223 |
| 2016/0098326 A1* | 4/2016 | Rebello | G06F 11/3648 714/55 |
| 2016/0099853 A1* | 4/2016 | Nedeltchev | H04L 43/0852 370/253 |
| 2016/0134516 A1* | 5/2016 | Hui | H04L 45/22 370/235 |
| 2016/0149788 A1* | 5/2016 | Zhang | H04L 43/10 709/224 |
| 2016/0182305 A1* | 6/2016 | Martin | H04L 41/12 726/10 |
| 2016/0182345 A1* | 6/2016 | Herdrich | H04L 43/50 709/224 |
| 2016/0226742 A1* | 8/2016 | Apathotharanan | H04L 43/12 |
| 2016/0277272 A1* | 9/2016 | Peach | H04L 43/0858 |
| 2016/0330111 A1* | 11/2016 | Manghirmalani | H04L 43/028 |
| 2016/0352601 A1* | 12/2016 | Zhang | H04L 43/0823 |
| 2017/0063705 A1* | 3/2017 | Gilson | H04L 47/286 |
| 2017/0078176 A1* | 3/2017 | Lakshmikantha | H04L 43/0852 |
| 2017/0093677 A1* | 3/2017 | Skerry | H04L 43/12 |
| 2017/0134538 A1* | 5/2017 | Mahkonen | H04L 69/22 |
| 2017/0141989 A1* | 5/2017 | Sufleta | H04L 43/0888 |
| 2017/0195362 A1* | 7/2017 | Schweitzer, III | G06F 11/0709 |
| 2017/0201435 A1* | 7/2017 | Tan | H04L 43/08 |
| 2017/0207997 A1* | 7/2017 | Martin | H04L 41/0896 |
| 2017/0339059 A1* | 11/2017 | Averi | H04L 47/80 |
| 2017/0366467 A1* | 12/2017 | Martin | H04L 43/08 |

\* cited by examiner

HIERARCHICAL TIME STAMPING MIRRORING LOGIC - 1100

HIERARCHICAL TIME STAMPING

FIELD OF INVENTION

This invention relates generally to data networking and more particularly to network latency analysis.

BACKGROUND OF THE INVENTION

A network element (such as a router or switch) transmits and receives network data using one or more ports of that network element. Each port on the network element has a physical link speed that limits the rate at which network data can be transmitted from that port. The network element uses one or more queues to store the network data that is to be transmitted from one of the ports of the network element. The maximum data that a queue stores is determined by the available buffer memory and a buffer configuration for the queue. When the amount of network data that is to be transmitted by one of the ports on a network element, or the overall data transmitted by a network element, is greater than the port or network element can handle within a given period, network congestion can occur, resulting in increased latency for network data propagation through the nodes on the network.

In many environments, but particularly in high performance computer networking and data center environments, it can be essential for network administrators to attain a complete understanding of network latency within and between network elements on the network. For example, performance and latency analysis is a key task in maintaining low latency, high-speed data networks such as financial trading networks. Several tools exist in the art to monitor network latency on such networks. Such tools include optical taps, synthetic traffic injection, data captures, or other methods that include the sampling or monitoring of selected regions of the network. One challenge presented by the use of such tools is that any time stamping or latency analysis is performed on only a subset of the network. A second timing network may be used to gain detailed analysis of network performance, but at a greatly increased cost of implementation.

SUMMARY OF THE DESCRIPTION

Various embodiments are described herein to enable network performance and latency analysis for production network data using hierarchical time stamps. A system of one or more data processing systems and network forwarding elements can be configured to perform particular operations or actions by virtue of having software, firmware, and/or hardware installed on the system that causes the system to perform the actions of the techniques described herein. The network elements described herein may be any one or more of a switch, router, hub, bridge, gateway, or any type of device that can provide access to a network (e.g., physical network, virtualized network, etc.).

One embodiment provides for a network element including a network port to receive production network data that is used for purposes other than testing the performance of a network; a data plane coupled to the network port, the data plane including a timing module to append a time stamp to a set of one or more time stamps included within the production network data; and a control plane coupled to the data plane, the control plane including a latency analyzer to analyze the set of one or more time stamps included within the production network data. Other embodiments include corresponding computer systems, apparatus, and computer programs recorded on one or more computer storage devices, each configured to perform the actions of the methods.

One embodiment provides for a non-transitory machine-readable medium storing instructions to cause one or more processing units of a network element to perform operations comprising receiving production network data at a network port of the network element, wherein the production network data is used for purposes other than testing the performance of a network; appending a hierarchical time stamp to a set of one or more hierarchical time stamps within the production network data; and analyzing the set of one or more time stamps included within the production network data using control plane logic of the network element to determine a latency between the network element and an additional network element on the network.

One embodiment provides for a network system comprising a set of network elements to interconnect a set of host devices, each network element in the set of network elements to append a time stamp to a unit of production network data received at the network element, the time stamp appended in a hierarchical manner to any existing set of timestamps on the unit of production network data. In a further embodiment the set of network elements includes a first network element to receive a unit of production network data, the first network element to apply a first time stamp to the unit of network data, the first time stamp including a coordinated universal time value; a second network element to receive the unit of production network data from the first network element, the second network element to append a second time stamp to the first time stamp; and a third network element to receive the unit of production network data from the second network element, where the third network element is to append a third time stamp to the second time stamp.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Embodiment described herein can be implemented in a network including enterprise level network elements (e.g., switch, router, etc.) having hardware assisted time stamping for production network data. One embodiment provides a hierarchical time stamping system in which time stamps are applied to network data as the data arrives at each node on the network. The time stamps are applied hierarchically, where an additional time stamp is appended to each unit of network data at each node within the network. The time stamps can be used to determine node-to-node latency within the network for production traffic, as well as determine the path of each unit of network data (e.g., packet, datagram, frame, etc.) as the data traverses the network.

To provide a thorough explanation of the various embodiments, numerous specific details are set forth herein. However, one having ordinary skill in the art will understand that embodiments may be practiced without these specific details. In some instances well-known components, structures, and techniques are not shown in detail to avoid obscuring key details within this description. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Network Elements and Network System

The processes depicted in the figures that follow, are performed by processing logic that comprises hardware (e.g., circuitry, dedicated logic, etc.), software (such as is run on a general-purpose computer system or a dedicated or specialized machine), or a combination of both. Although some of the processes are described below in terms of sequential operations, it should be appreciated that some of the operations described may be performed in a different order. Moreover, some operations may be performed in parallel rather than sequentially.

Figure 1:
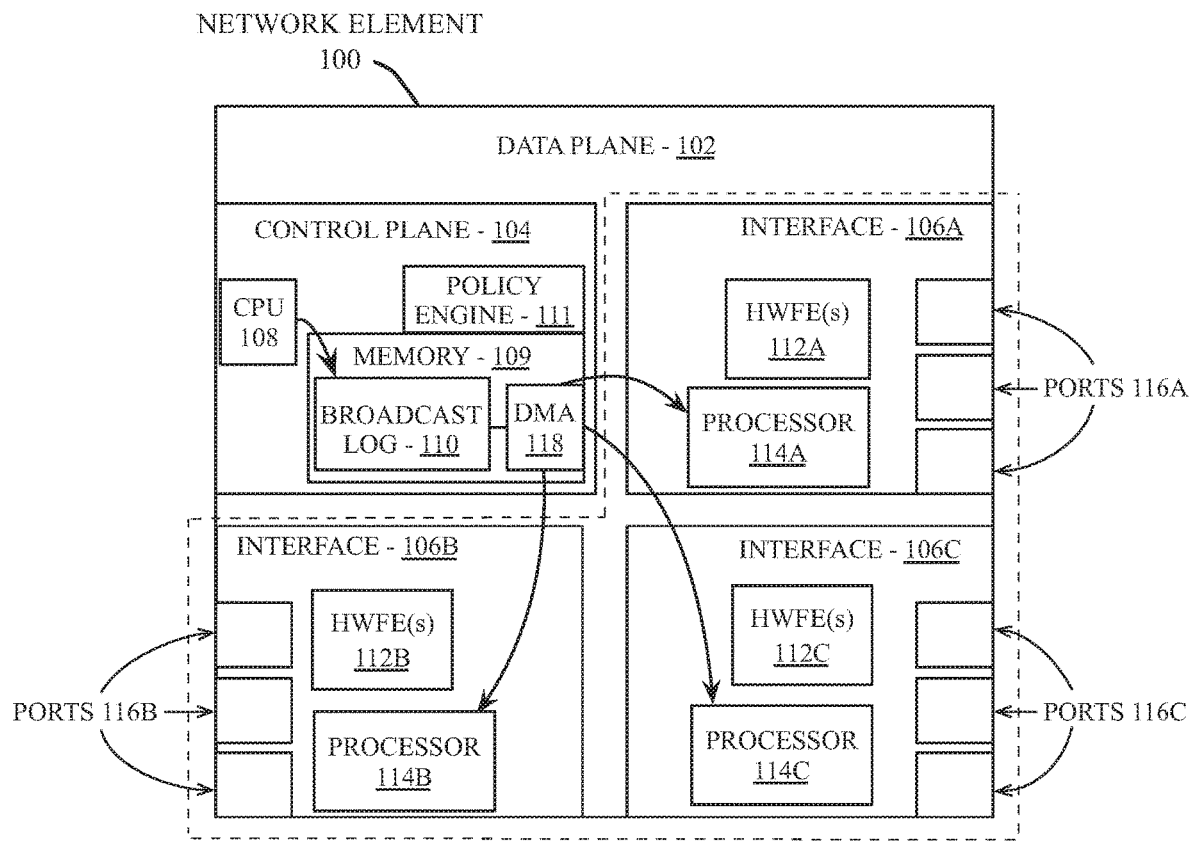
FIG. 1 is a block diagram of one embodiment of a network element including a data plane coupled to a control plane and several interface devices.

FIG. 1 is a block diagram of one embodiment of a network element 100 that includes a data plane 102 coupled to a control plane 104 and several interface devices 106A-C. In some network elements, the data plane 102 is referred to as the forwarding plane. In one embodiment, the control plane 104 includes central processing unit (CPU) 108 and memory 109 to store data. The CPU 108 can be used to process information for the control plane 104 and write configuration data for hardware forwarding engines 112A-C in the network interface devices 106A-C. Additionally, the CPU can read data from the hardware forwarding engines 112A-C, in one embodiment, using the broadcast log 110. In one embodiment, the data plane 102 receives, processes, and forwards network data using various configuration data (e.g., forwarding, security, quality of service (QoS), and other network traffic processing information). The data plane 102 includes multiple network interface devices 106A-C (e.g., switches, routers, etc.) that can each receive, process, and/or forward network traffic. Each of the interface devices 106A-C includes multiple ports 116A-C that are used to receive and transmit network data.

In one embodiment, for each received unit of network data, the data plane 102 determines a destination address for the network data, looks up the requisite information for that destination in one or more tables stored in the data plane, and forwards the data out the proper outgoing interface, for example, one of the interface devices 106A-C. In one embodiment, each of the interface devices 106A-C includes one or more hardware forwarding engines (HWFE(s)) 112A-C, processor 114A-C, and ports 116A-C, respectively. Each of the hardware forwarding engines 112A-C forwards data for the network element 100 by performing routing, switching, or other types of network forwarding. Each processor 114A-C can be used to accelerate various functions of the interface devices 106A-C. For example and in one embodiment, the processors 114A-C can read and write from a broadcast log 110 in the control plane 104 to program the corresponding hardware forwarding engines 112A-C. The processors 114A-C can also push data from the hardware forwarding engines 112A-C to a CPU 108 in the control plane 104.

In one embodiment, the control plane 104 gathers the configuration data for the hardware forwarding engines 112A-C from different sources (e.g., locally stored configuration data, via a command line interface, or other management channel (e.g., SNMP (Simple Network Management Protocol), Simple Object Access Protocol (SOAP), Representational State Transfer type Application Programming Interface (RESTful API), XML APIs, JSON APIs, Hypertext Transfer Protocol (HTTP), HTTP over Secure Sockets layer (HTTPs), Network Configuration Protocol (NetConf), Secure Shell (SSH), and/or another management protocol) and pushes this configuration data to the hardware forwarding engines 112A-C.

In one embodiment, the memory 109 that is used to store data for the control plane 104 is shared with the data plane 102. In such embodiment a direct memory access (DMA) controller 118 is coupled to the memory 109 to allow processors 114A-C direct access to the memory 109. In one embodiment, the DMA controller 118 allows the processors 114A to directly access the broadcast log 110 without requiring the CPU 108 in the control plane 104 to send data to each processor 114A-C. In one embodiment, the control plane 104 includes a policy engine 111 to apply a QoS policy to network traffic flowing through the network element 100. The policy engine 111 can be configured to minimize the latency of some type of network traffic, or to apply traffic shaping policies on the overall flow of traffic through the network element, or within a larger network topology. Proper determination of real-time latency data within the network can be key to the implementation of effective QoS policy. In one embodiment, logic to perform the timing of network data flow is consolidated into the hardware of the data plane 102 of each network element 100.

The network element 100 can be incorporated into a network as any one or more of a switch, router, hub, bridge, gateway, etc., or any type of device that can provide access to a network (e.g., physical network, virtualized network, etc.). In various embodiments, different types of protocols can be used to communicate network (e.g., Ethernet, wireless, Synchronous Optical Networking (SONET), Fiber channel, Infiniband, etc.). The network data being communicated by the data plane 102 can be a stream of network frames, datagrams or data packets, or other types of discretely switched network data. In one embodiment, the network element 100 communicates network data between various networked devices using a variety of communicating techniques (e.g., layer-2 switching, layer-3 routing, traffic shaping, applying a quality of service (QoS) policy, etc.).

Figure 2:
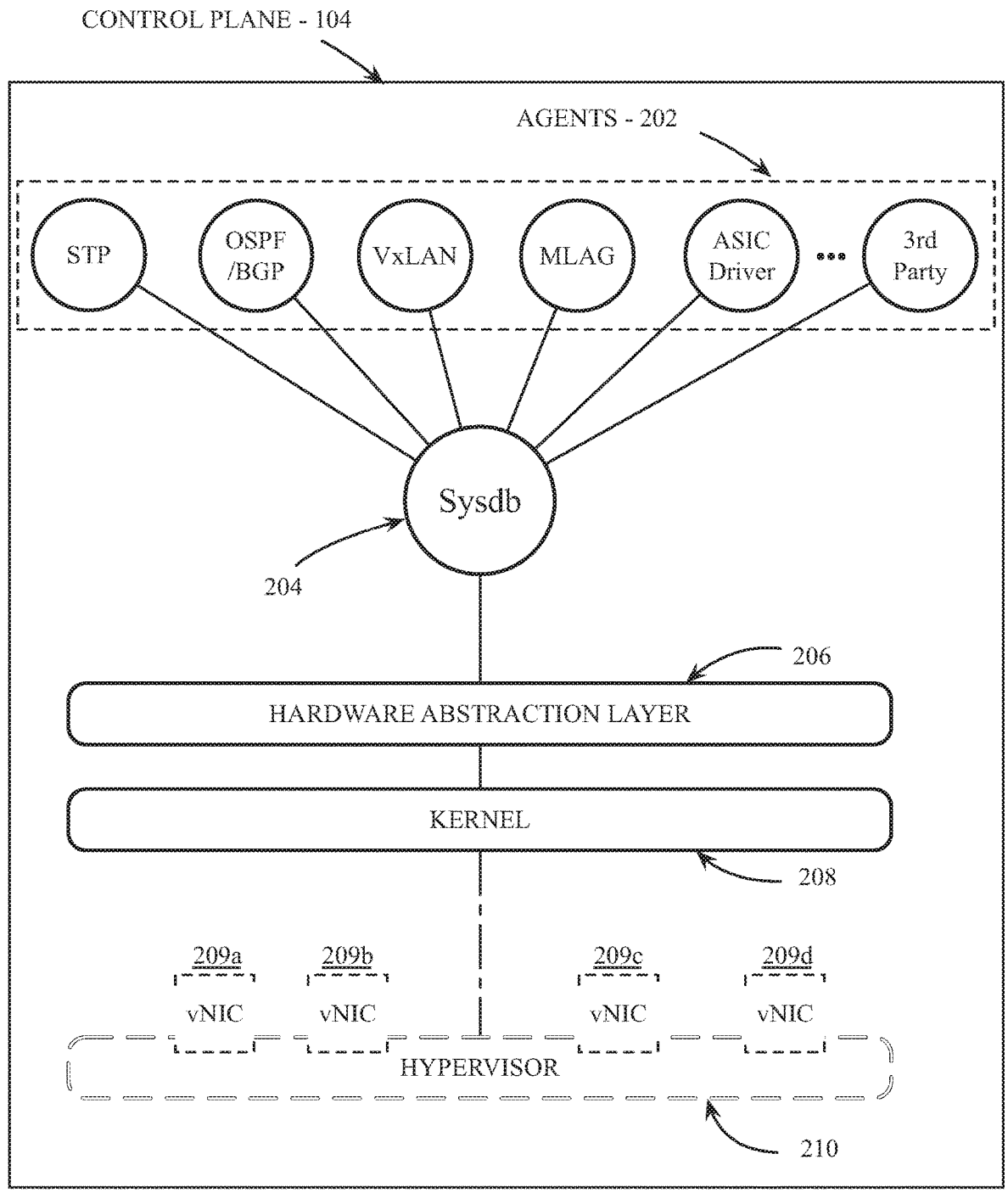
FIG. 2 is a block diagram of a network element operating system, according to an embodiment.

FIG. 2 is a block diagram of a network element operating system 200, according to an embodiment. In one embodiment, the network element operating system 200 resides in the control plane (e.g., control plane 104) of a network element 100 as in FIG. 1. The network element operating system 200 includes multiple agents 202 including, but not limited to agents to perform operations to implement Spanning Tree Protocol (STP), Open Shortest Path First (OSPF)/Border Gateway Protocol (BGP), Virtual eXtensible LAN (VxLAN), and Multi-Chassis Link Aggregation (MLAG). The agents can additionally include one or more forwarding drivers for an application specific integrated circuit (ASIC), as well as third-party agents. In one embodiment, the agents each communicate with a central system database (e.g., Sysdb 204). In one embodiment, the network element operating system 200 additionally includes a hardware abstraction layer 206 to abstract hardware specific details to enable the network element operating system 200 to operate on a variety of different hardware associated with different models and implementations of network elements. A kernel 208 provides core operating system functionality such as scheduling and base level system resource management. In one embodiment, the network element operating system 200 can be operated within a virtual machine, and can provide virtual network interface cards (vNIC 209a-d) via a hypervisor 210.

In one embodiment, each of the multiple agents 202 interfaces with the Sysdb 204 to record configuration state and operational status. In such embodiment, agents in the system mount can mount the Sysdb 204 to send and receive configuration and status. Read and write permissions can be specified for each mount. In one embodiment, Sysdb utilizes an event-driven publish/subscribe model. If the configuration state of an agent changes, Sysdb can send an event notification to that agent, which will then update its local copy. Similarly when the agent writes to the Sysdb mount, the agent changes its local copy and the write returns immediately. This change notification can be buffered and asynchronously sent to Sysdb, which then notifies all other agents who have subscribed to the changed agent. In one embodiment Sysdb information is maintained in RAM, along with other status and state information, and once the network element is turned off or restarted, such information is lost. In other embodiments, network elements include a sufficient amount of sufficiently high performance local storage to store Sysdb information in non-volatile memory.

In embodiments described herein, network element configuration status and operational state agent transmits Sysdb information, as well as forwarding configuration data, to one or more centralized collector nodes that archive status and status information for multiple network elements on a network. The collected information can include all data in shared memory of the network element, including but not limited to interface tables, ARP tables and routing tables, system logs (e.g., syslog, agent logs), and hardware specific state, such as interface counters, service counters, etc. In one embodiment, data visible to the kernel 208 and/or hardware abstraction layer 206 can also be collected.

Hierarchical Time Stamp

Figure 3:
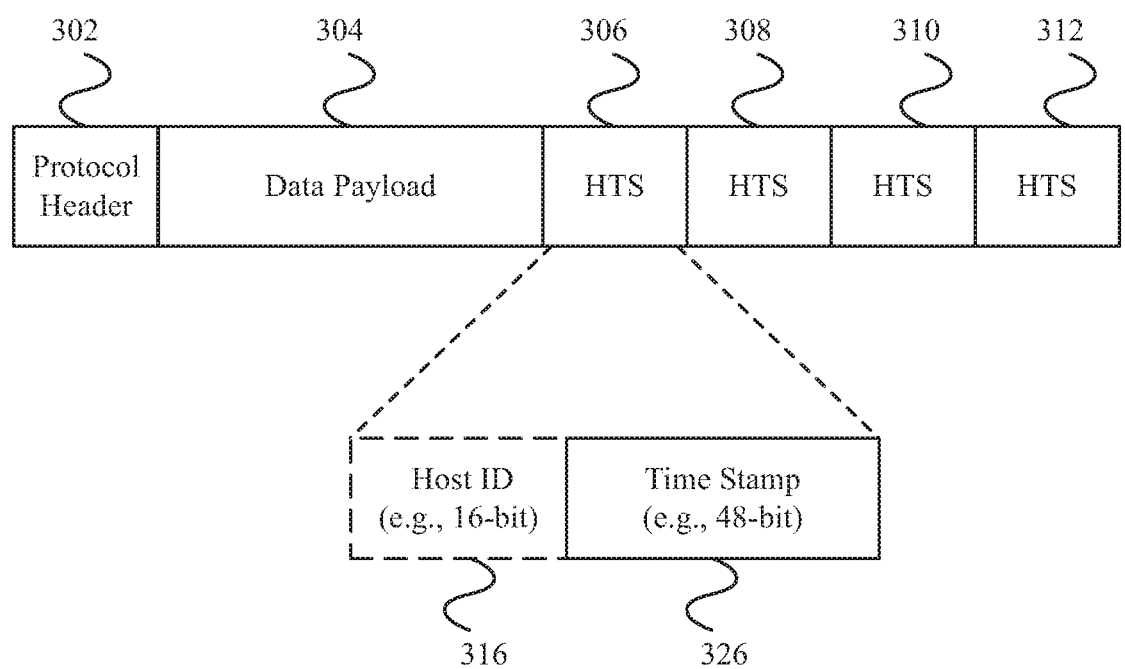
FIG. 3 is a block diagram of a hierarchical time stamp, according to an embodiment.

FIG. 3 is a block diagram of a unit of network data including a set of hierarchical time stamps 300, according to an embodiment. The exemplary unit of network data includes a network protocol header 302, a data payload 304, and a set of hierarchical time stamps (HTS) including a first hierarchical time stamp 306, a second hierarchical time stamp 308, a third hierarchical time stamp 310, and a fourth hierarchical time stamp 312, where each hierarchical time stamp 306-312 represents a network element through which the exemplary unit of network data has traversed. The maximum number of time stamps that may be applied to a single unit of network data can vary among embodiments. While the hierarchical time stamps 300 are shown appended to the end of the data payload 304, the time stamps can be inserted into any region of the unit of network data. For example and in one embodiment, the entire unit of network data can be encapsulated within a time stamp header upon entry into a monitored region of the network and the unit of network data can be de-encapsulated when exiting the monitored region.

The network protocol header 302 can be associated with one of any number of network protocols, including layer-3 protocols such as Internet Protocol (IP), or layer-2 protocols such as Ethernet. In other words, the use of hierarchical time stamps is not limited to any particular protocol or network layer. In one embodiment, the hierarchical time stamps are inserted into an otherwise unused portion of the unit of network data. Accordingly, the network data can still be forwarded and operated on by network elements lacking support for hierarchical time stamps, although such network elements may ignore the appended time stamp data. In one embodiment, where insertion of any of the hierarchical time stamps 306-312 invalidates cyclic redundancy check (CRC) data associated with the data payload 304, the time stamping system can automatically recalculate and modify the CRC after applying the hierarchical time stamp to the unit of network data.

FIG. 3 also shows an exploded view of exemplary time stamp 306. In one embodiment, each time stamp includes a host identifier (e.g., host ID) 316 and a time stamp 326. In one embodiment, the host ID 316 may be excluded from the time stamp or may be applied only by a subset of the network elements within a network. In one embodiment the specifics of the host ID 316 and time stamp 326 can vary among network elements and may be related to the specifics of the network processors or ASICs within the forwarding plane of each network element. Additionally, the width of the host ID 316 and time stamp 326 data fields can vary among embodiments. In one embodiment each host ID 316 can be up to 16-bits in length. In one embodiment, each time stamp can have up to 48-bits of timing precision, although other time stamp widths greater than 32-bits (e.g., 36-bits) may be used. In one embodiment the total with of each combination of time stamp 326 and host ID 316 is 64-bits.

In one embodiment the time stamp 326 is configured based on a global, UTC based time that may be initialized to the same time on each network element. The timing system on each network element may be synchronized to maintain a globally consistent timing system, such that a consistent and comparable timestamp is applied by all network elements within a network. For example, where the time stamp has 48-bits of timing precision, the timing system on each network element can be configured to apply the lower 48-bits of the current UTC time when new time stamp is applied to a unit of network data.

Figure 4:
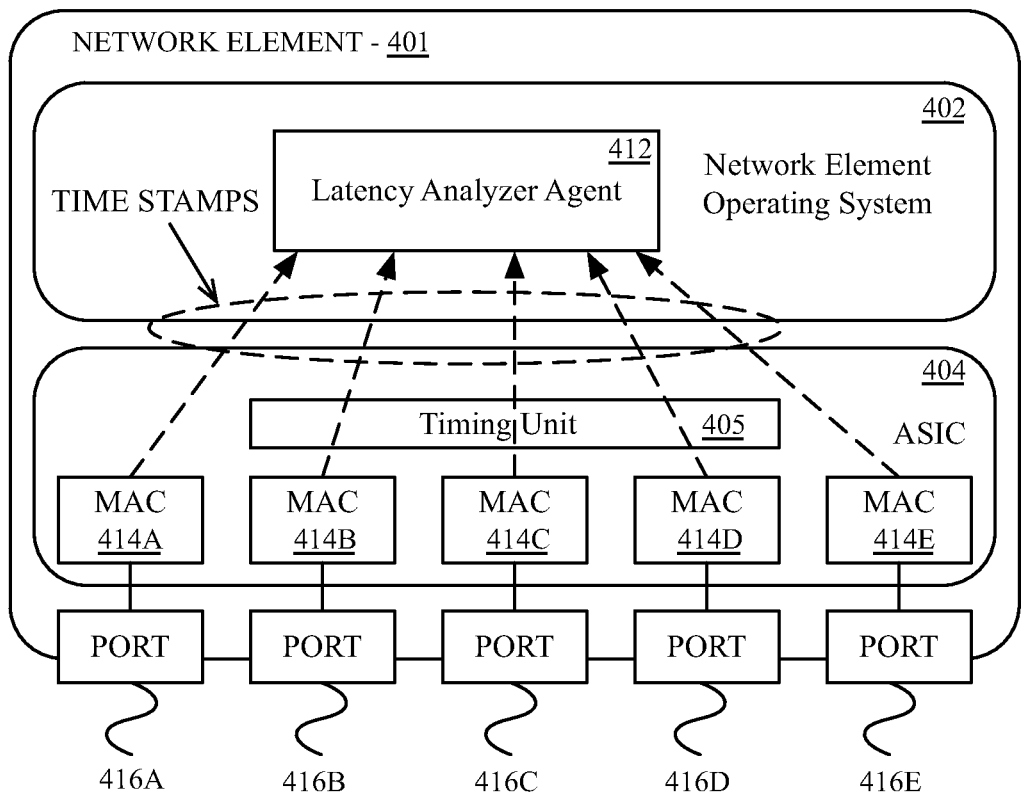
FIG. 4 is a block diagram of a time stamp application and reporting according to an embodiment.

FIG. 4 is a block diagram of a time stamp application and reporting system 400 according to an embodiment. In one embodiment the time stamp application and reporting system 400 resides in a network element 401 as described herein. A control plane processor of the network element 401 can execute a network element operating system 402 such as the network element operating system 200 of FIG. 2. The network element operating system 402 can include a latency analyzer agent 412 that receives the time stamps (e.g., hierarchical time stamps 300 as in FIG. 3) that are applied to units of network data that traverse the network element 401. The latency analyzer agent 412 can perform various operations to track and report high latency or congestion events within the network element 401. Additionally, the latency analyzer agent 412 can analyze the time stamp hierarchy on each hierarchical time stamp to determine latency for other network elements that are upstream relative to an ingress unit of data, which will include a time stamp from each previously traversed node on the network that is configured to apply a hierarchical time stamp.

In one embodiment, an ASIC 404 on the forwarding plane of the network element 401 can receive and transmit data through a set of ports 416A-E that provide a physical interface to the network. In one embodiment, each port 416A-E is coupled to a media access control (MAC) unit 414A-E that provides processing logic of the ASIC with channel access to the physical hardware of each port 416A-E. In one embodiment, each MAC 414A-E couples to a timing unit 405 to enable application of high-precision time stamps to network data. The network data can be time stamped based on a policy configured for the network element 401. In one embodiment, when hierarchical time stamping is enabled, all incoming units of network data at each port 416A-E are time stamped by an associated MAC 414A-E hardware on ingress to the network element 401. However, other techniques are also possible. For example, network data may be time stamped on egress from the network element. In one embodiment, network data may be time stamped on ingress and egress to each network element 401, although another, separate timing system may be used to determine the traversal latency of the network element 401. Such internal-only time stamps may be removed from the network element upon egress from the network element. However, the internal-only time stamps may make use of the timing precision provided by the timing unit 405 and the hierarchical time stampings described herein.

Figure 5:
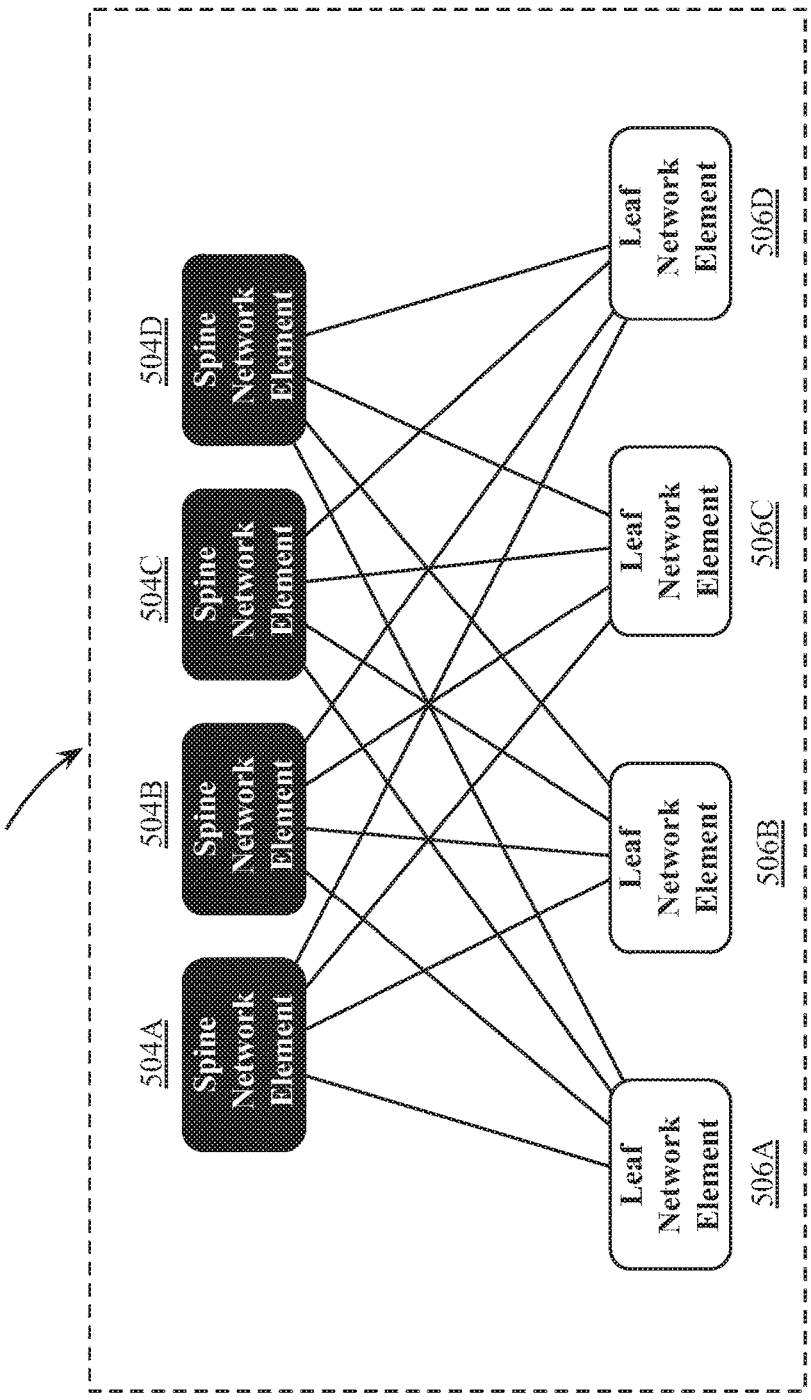
FIG. 5 is an illustration of an exemplary leap-spine topology.

FIG. 5 is an illustration of an exemplary leaf-spine topology 500 for use in a high-speed network. The leaf/spine topology 500 can define a production network region 502 in which production network data flows between hosts. A set of spine network elements 504A-D can be coupled to a set of leaf network elements 506A-D over a multi-path switching fabric. The leaf/spine topology 500 is an alternate to the traditional three-layer core/aggregation/access network architecture. The leaf network elements 506A-D mesh into the spine network elements 504A-D using a layer-2 (e.g., Ethernet) protocol, or can use a layer-3 (e.g., TCP/IP) protocol in which one or more virtual layer-2 networks (e.g., VLANs) are defined. The spine network elements 504A-D provide the core data connections for the network, while the leaf network elements 506A-D provide access to the network for host devices (e.g., servers, workstations, virtual machines). In one embodiment, all routes through the network are configured in an active state through the use of Equal-Cost Multi-pathing (ECMP), allowing all connections to be utilized while avoiding loops within the network.

Figure 6:
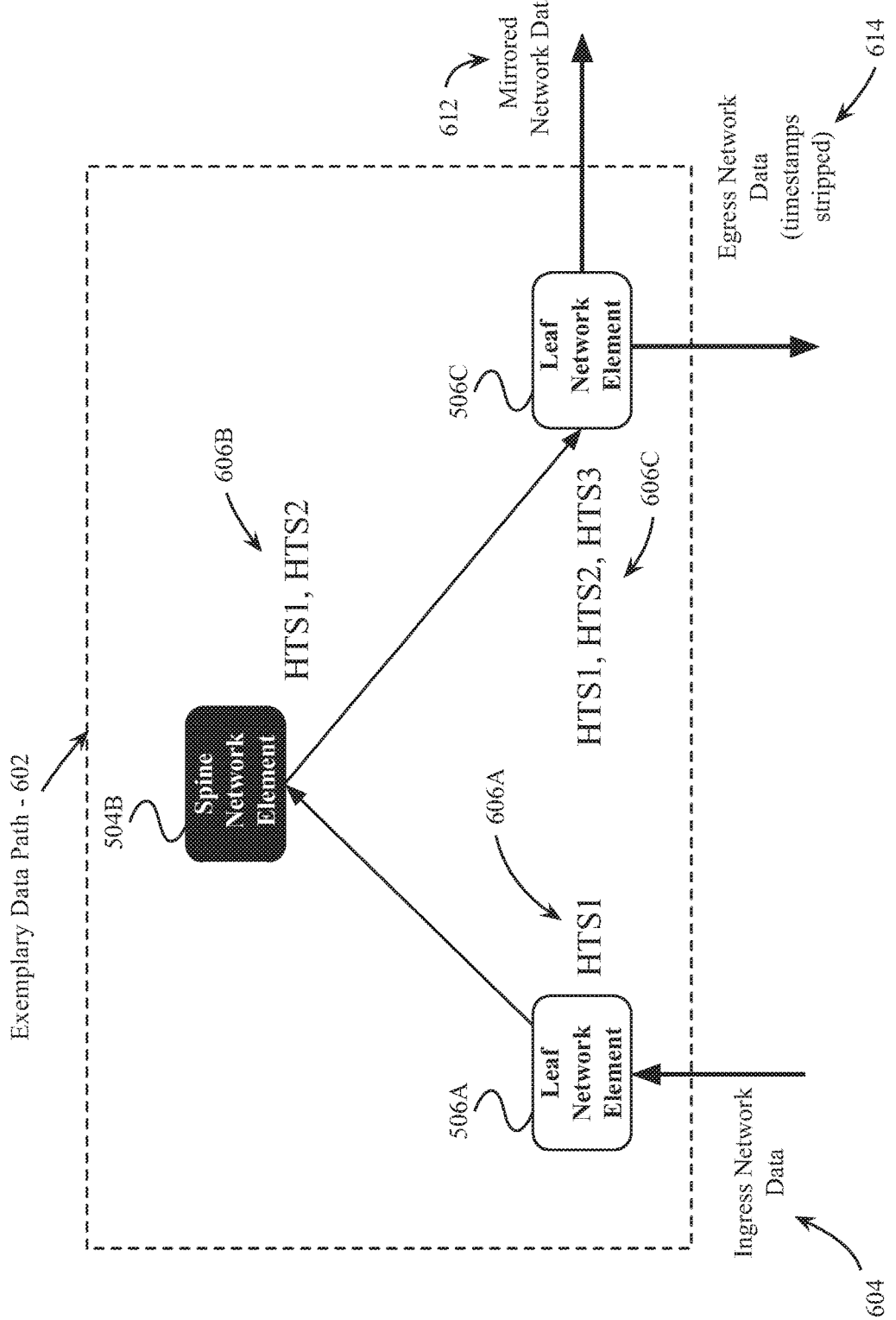
FIG. 6 is an illustration of hierarchical time stamp accumulation across a network path, according to an embodiment.

FIG. 6 is an illustration of a time stamp accumulation process 600 on a leaf-spine topology, according to an embodiment. An exemplary data path 602 is shown for a unit of network data that is forwarded through a production network. A unit of ingress network data 604 can be received at leaf network element 506A, which includes time stamping logic configured to create a time stamp hierarchy 606A including a first hierarchical time stamp (HTS1), such as the hierarchical time stamp 306 shown in FIG. 3. The unit of network data can be forwarded to spine network element 506B, which includes time stamping logic configured to add a second hierarchical time stamp (HTS2) to create time stamp hierarchy 606B that includes HTS1 and HTS2. Spine network element 504B can forward the unit of network data to leaf network element 506C, which includes time stamping logic configured to add a third hierarchical timestamp (HTS3) to create time stamp hierarchy 606C that includes HTS1, HTS2, and HTS3.

The next hop for the network data from leaf network element 506C may not include support for HTS data or may otherwise not be configured to handle or apply hierarchical time stamps. For example, the next hop may be a host or end station for the network region that is not involved in the collection or analysis of time stamp data or may be a network element outside of a monitored region of the network. To accommodate such scenario, in one embodiment all of the hierarchical time stamps can be stripped from the egress network data 614 as the data exits the monitored network region of the production network. In one embodiment, a set of mirrored network data 612 retaining the hierarchical timestamps can be transmitted via a mirror port of the leaf network element 506C. The set of mirrored network data 612 may include a complete copy of all units of egress network data 614, a sampled subset of the units, and/or a sampled portion of the units (e.g., headers only, time stamps only, etc.). The time stamp accumulation process 600 is optimized for use in production networks on production network data. However, in one embodiment the mirrored network data 612 may be transmitted to a separate timing network where more extensive analysis is performed. This analysis may be used to correlate or validate latency analysis performed by control plane agents of the production network elements and/or analysis performed by a network management system as described below.

Exemplary Network Management System

Network performance monitoring via the application and analysis of hierarchical time stamps can be implemented in conjunction with a central network management system. In one embodiment, each network element includes a software system, (e.g., network element software system 200 as in FIG. 2) which continually communicates with the central network management system to synchronize state and receive configuration changes or updates. The central network management system is not limited to any specific software defined network management system, but may be any system which coordinates software configurable network elements in a network and/or datacenter environment.

Figure 7:
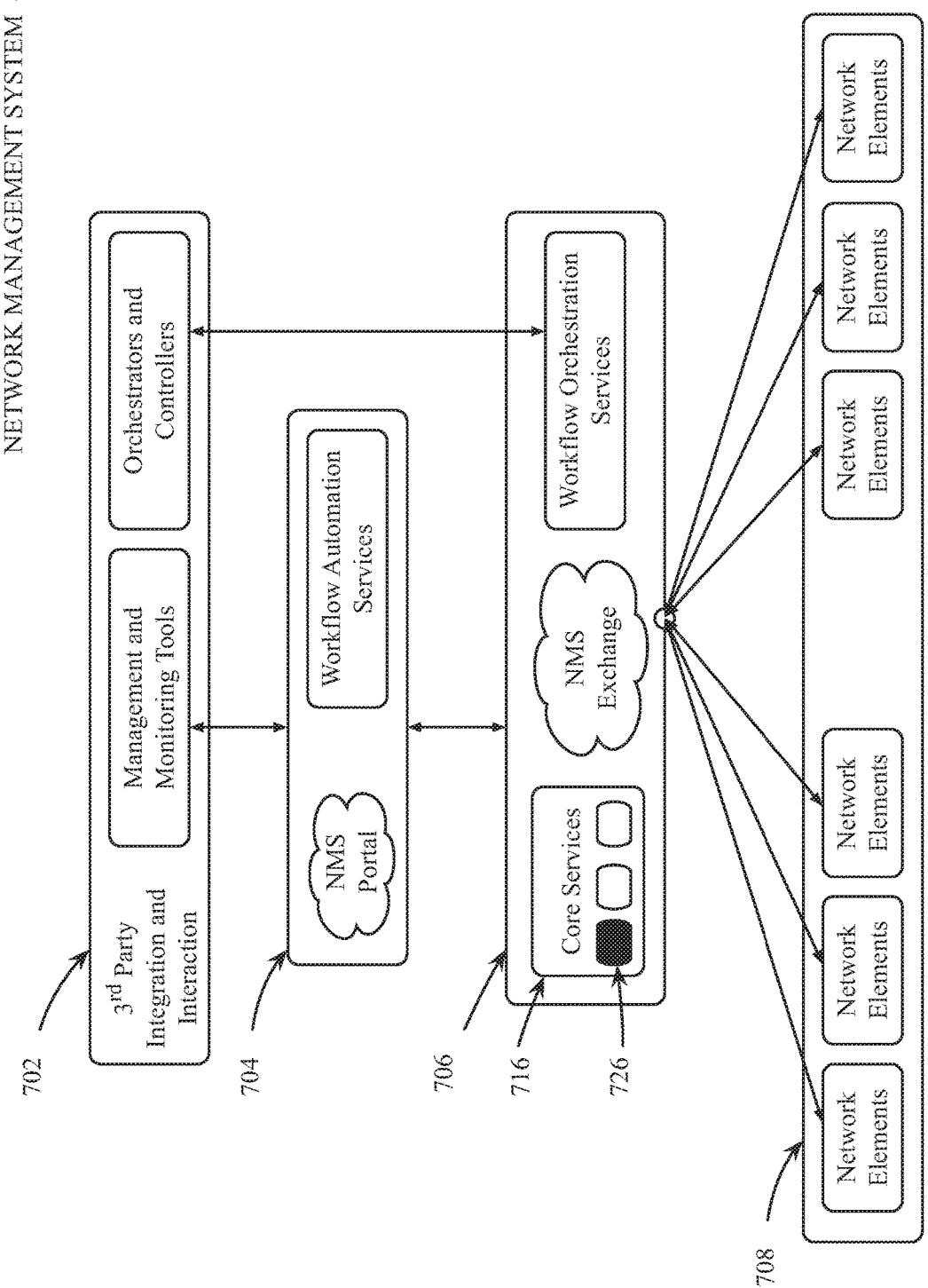
FIG. 7 is a block diagram of an exemplary network management system including logic for latency analysis.

FIG. 7 is a block diagram of an exemplary network management system 700, according to an embodiment. The network management system 700 may be a variant of the CloudVision® Framework provided by Arista Networks™ of Santa Clara, Calif. In one embodiment the network management system 700 has a multi-layer/multi-tier architecture including a 3$^{rd}$ party integration and interaction layer 702, a network management system (NMS) portal layer 704, and an NMS exchange layer 706. The network management system 700 may execute as a VM based virtual server on a network management device. One or more portions of the network management system 700 may also be configured to execute within the control plane of a one or more network elements within the network.

The $3^{rd}$ party integration and interaction layer 702 can include management and monitoring tools, as well as orchestrators and controllers that are provided by $3^{rd}$ party service providers to manage and control a set of network devices. The $3^{rd}$ party service provider tools in the $3^{rd}$ party integration and interaction layer 702 can communicate with an NMS portal layer 704. The NMS portal layer 704 provides a mechanism for the network to achieve cloud scale automation without significant additional development effort. In one embodiment, the NMS portal layer 704 includes workflow automation services that automate network services and provide zero touch provisioning capability for network elements in a network element layer 708, such that network elements may be coupled to the network and centrally provisioned via software.

The NMS portal layer 704 can communicate with an NMS exchange layer 706. The NMS exchange layer 706, in one embodiment, is a network-side multi-function control point that may be configured to execute on a network element in the network element layer 708 or can be deployed as virtual machine executing on a host coupled to a network element. The NMS exchange layer 706 includes a set of workflow orchestration services and core services 716 that provide core management services for the network management system. Once the NMS exchange layer 706 is deployed, network elements can be connected to provide a single point for real-time provisioning, orchestration and integration with multi-vendor (e.g., $3^{rd}$ party) controllers. Additionally, automatic topology discovery can be performed to utilize state and status information received from each network element in the network element layer 708. The received state and status information can be aggregated and used to provide an overview of the functions and operations of each network element in the network.

In one embodiment the core services 716 provided by the network management layer 706 can be performed at least in part by one or more service modules including at least a latency data aggregator 726. The latency data aggregator 726 can communicate with and receive data from a latency analyzer in each network element in the network element layer 708, for example, the latency analyzer agent 412 as in FIG. 4. The latency data aggregator 726 can aggregate the time stamp and latency data to provide an analysis of latency data across multiple paths of the network.

Exemplary Latency Analysis

Figure 8:
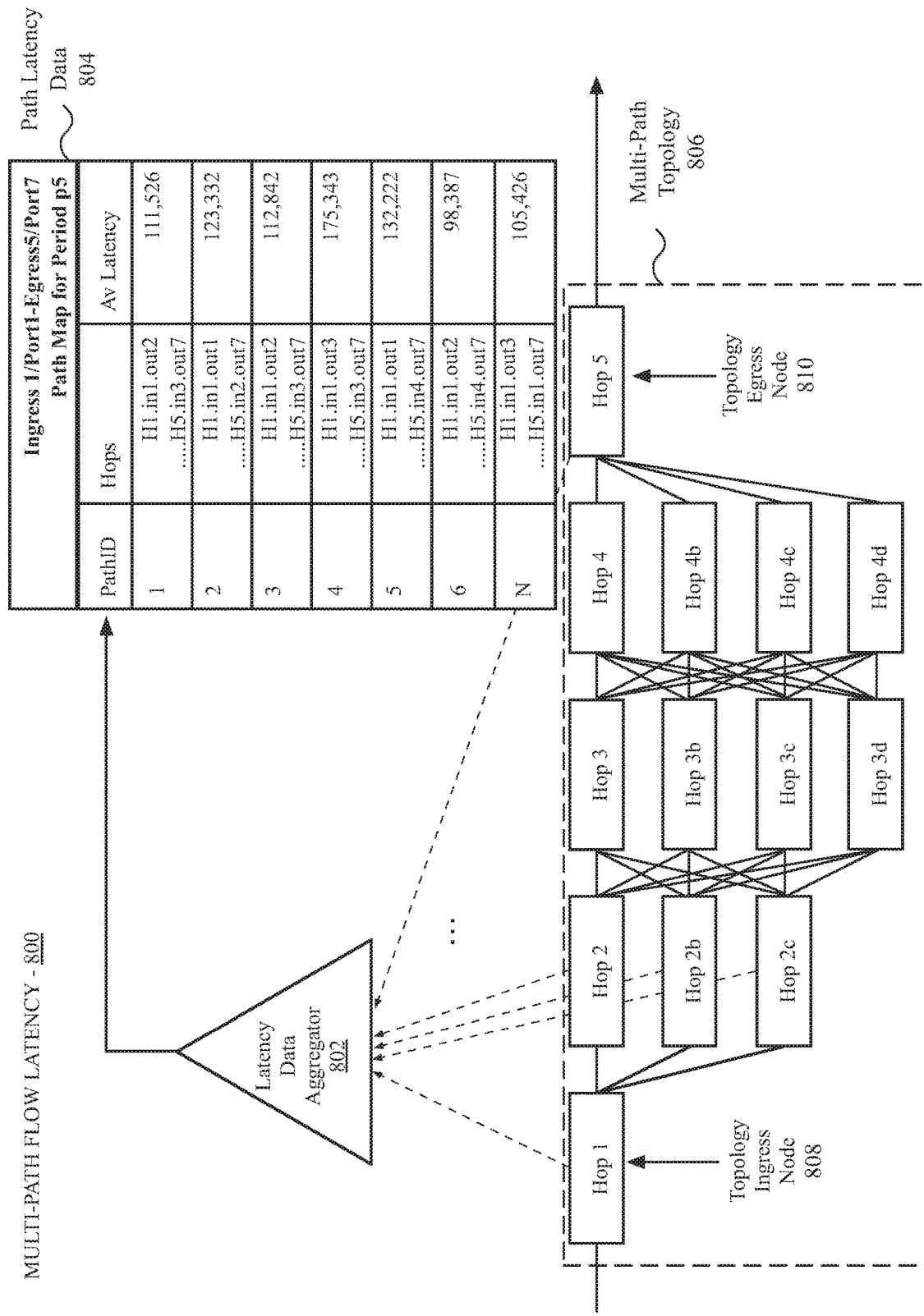
FIG. 8 is an illustration of multi-path flow latency within a network, according to an embodiment.

FIG. 8 is an illustration of the determination of multi-path flow latency 800 between a pair of nodes within a network, according to an embodiment. In one embodiment, a latency data aggregator 802, such as the latency data aggregator 726 as in FIG. 7, consumes latency data to generate a set of latency data 804 for the multiple paths between nodes within a multi-path topology 806. In this embodiment, each of the multiple paths between an ingress node 808 (e.g., hop 1) and an egress node 810 (e.g., hop 5) can be measured for latency using aggregated latency data and the latency data along each path can be correlated and aggregated to determine an average latency for each path. In one embodiment, latency data for each network element and link along the path can be determined and reported graphically via network management software.

Additionally, the determined latency data can enable network administrators to verify configured paths for data within the multi-path topology 806. For example, the exemplary topology latency data 804 shows a first path having a path ID of 1 beginning at the network element of hop 1 (e.g., the topology ingress node 808), entering the network element at interface 1, exiting the network element at interface 2 (e.g., toward hop 2b), and ultimately proceeding, for example, through hop 4C before arriving at interface 3 of the network element at hop 5 before egressing the egress node through interface 7 of the network element at hop 5. A network administrator can use the path data to determine if the detected path for any classes of traffic flow differs from any pre-configured paths for those data classes in addition to detecting network congestion within the multi-path topology 806 in real time.

In one embodiment, the latency data 804 reports an average end-to-end latency for all network data through path 1 (e.g., 111,526 nanoseconds). In one embodiment, the average end-to-end latency of network data traversing the path is updated and reported in real time as network conditions along the path change, or the sample period for each path is adjusted. While in one embodiment, data along each path is transported using the same protocol, in alternate embodiments, different paths can transports the data with different protocols and/or different quality of service parameters. In addition to real time reporting, in one embodiment the latency data aggregator 802 also provides support for historical network latency reporting based on stored information. Additionally, network elements may be configured to provide historical network latency information to the latency data aggregator 802. In one embodiment the degree to which real time or historical information is provided by a network element may vary based on the local storage and processing capabilities within each element.

The latency data 804 shown is exemplary, and additional dimensions of data may also be generated. For example, latency data may be generated a source-destination tuple over a period of time. In one embodiment, based the metadata available to a reporting network element (e.g., ingress node 808, egress node 810) or an aggregator (e.g., latency data aggregator 802) latency data can be determined for network data from remote source networks, or for network data that is destined to remote destination networks. For example, in one embodiment the latency data aggregator 802 can determine that network data arriving at a topology ingress node 808 originated from a specific remote subnet, where some percentage of the remote source subnet data arrives at a network port or interface, while a second percentage of remote source subnet data arrives at a second or third port or interface. In one embodiment the latency data aggregator 802 can determine a percentage of network data from the remote source subnet that is destined for a specific remote destination subnet, including determining performance data for network data from specific source and destination subnets when the network data takes multiple paths through the multi-path topology 806. For example, some percentage of the network data from the remote source subnet may take a first path through the multi-path topology 806, while a second percentage of network data from the remote source subnet may take a second path through the multi-path topology 806, ultimately to arrive at the same remote destination subnet. Accordingly, topology latency data 804 may be used to determine wider patterns of network performance beyond the sampled network, as a set of flows may have the same ingress and egress points but may be associated with different applications, protocols, or different source and destination networks depending on the devices that are connected to an ingress/egress node.

Figure 9:
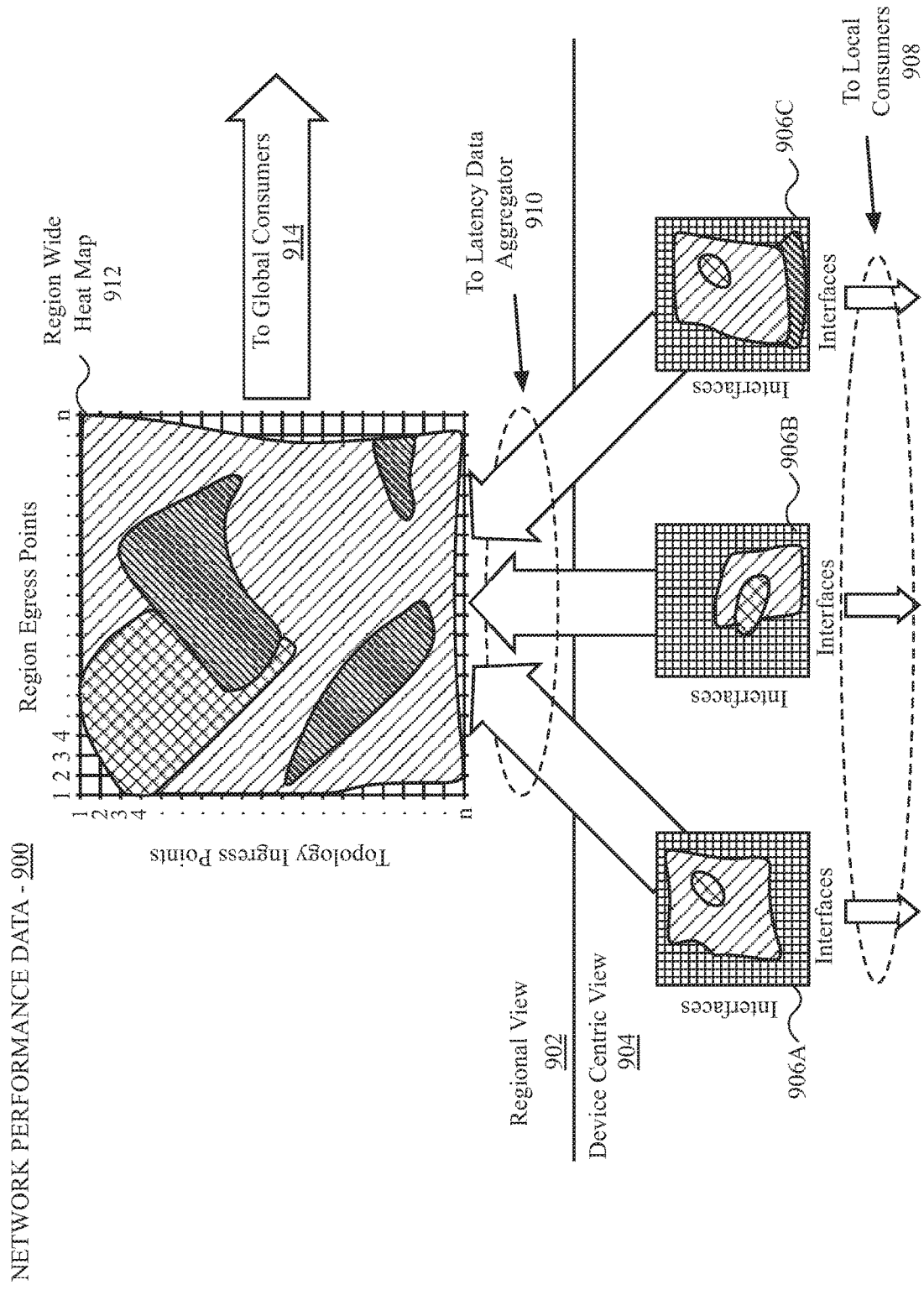
FIG. 9 is an illustration of generation, consumption, and export of topology performance data at a per-device and topology centric level, according to an embodiment.

FIG. 9 is an illustration of generation, consumption, and export of network performance data 900 at a per-device and regional level, according to an embodiment. In one embodiment, a consumer of latency data can configure data generation and visualization for a regional view 902 and device centric view 904. For example, the exemplary device centric view 904 includes latency data and data visualizations (e.g., heat maps 906A-C) for interface pairs on multiple network elements. The latency data generated is exported 908 to other local consumers at each individual device level and is also transmitted 910 to a latency data aggregator to generate data and visualizations in the regional view 902. For example a region wide heat map 912 showing latency for paths beginning and ending at various ingress and egress points of a network region. The regional data can be further export 914 to global consumers. For example, discovery and determination of multi-path flow latency 800 can be performed as shown in FIGS. 8, and such data can be exported 914 to global consumers for further analysis, processing or visualization. Such data may be used, in one embodiment, to drive external 'controllers' that influence forwarding decisions within the monitored region. For example, routing metrics may be changed to perform one path over a different path due to underutilization or reduced latency along a specific path.

Hierarchical Time Stamping Logic

Figure 10:
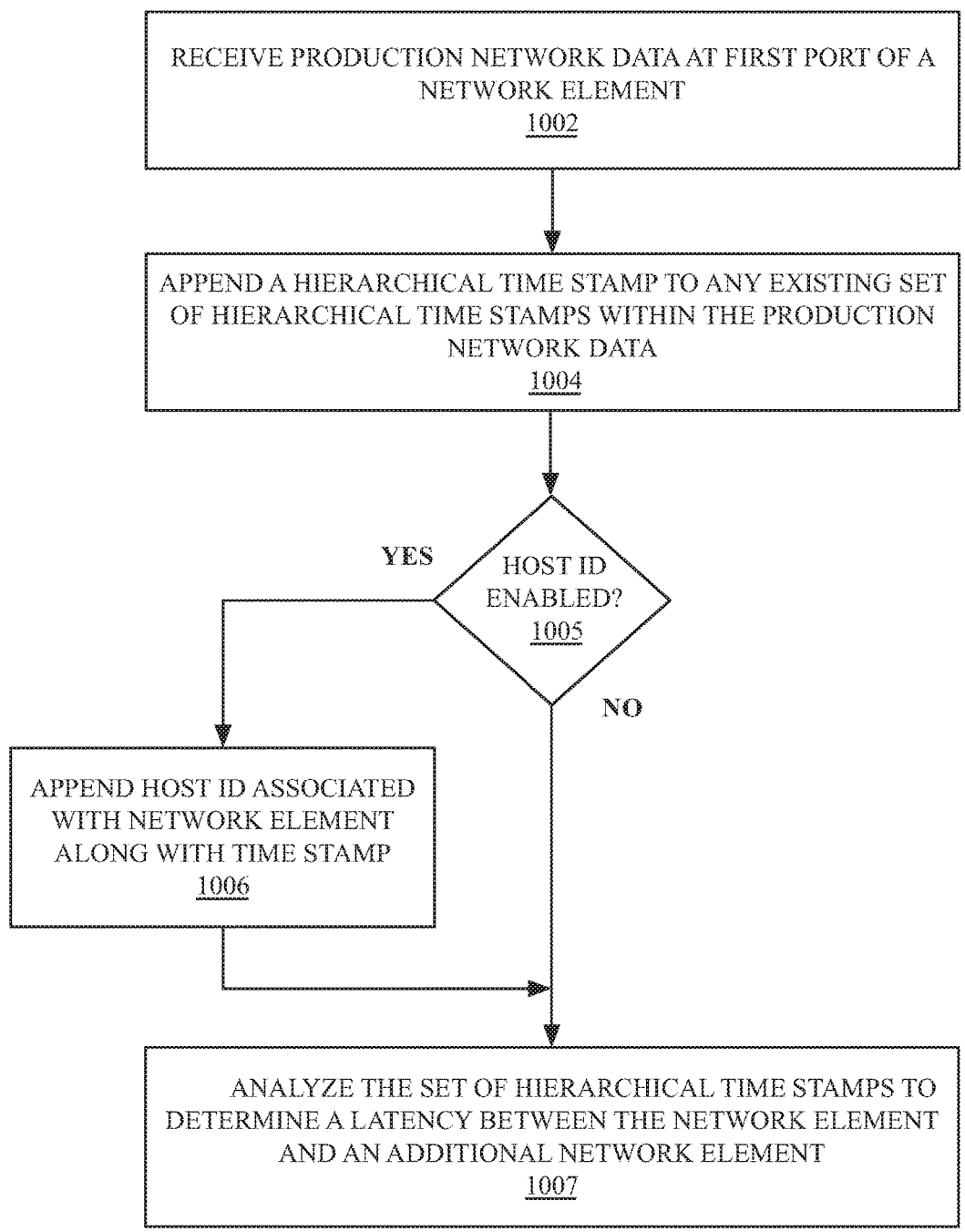
FIG. 10 is a flow diagram of an overview of hierarchical time stamping logic, according to an embodiment.

FIG. 10 is a flow diagram of an overview of hierarchical time stamping logic 1000, according to an embodiment. The hierarchical time stamping logic 1000 can be implemented at least in part by a network processing ASIC, such as the ASIC 404 of FIG. 4, which includes a high precision timing unit 405. In one embodiment the hierarchical time stamping logic 1000 is configured to operate on production network data. Production network data is network data that is used for purposes other than testing the performance of a network, as opposed to network data on a separate timing network. The hierarchical time stamping logic 1000 can operate without introducing any additional delay or latency into the forwarding of the data, which may be of particular importance when in operating within network segments or regions configured explicitly for low forwarding latency operation (e.g., less than 350 nanoseconds).

In one embodiment the hierarchical time stamping logic 1000 can receive production network data at a network port of a network element, as shown at block 1002. The hierarchical time stamping logic 1000 can then append a hierarchical time stamp to any existing set of hierarchical time stamps within the production network data at block 1004. If no timestamps exists within the network data, the hierarchical time stamping logic 1000 can append the time stamp to the end of the data payload of the network data, as illustrated with exemplary hierarchical time stamp 306 in FIG. 3. In one embodiment, appending a timestamp to the data payload includes recalculating a cyclic redundancy check (CRC) code (e.g., frame check sequence, etc.) for the data payload. In one embodiment the CRC is also recalculated for each additional time stamp added to the time stamp hierarchy.

A host identifier may or may not be included within an embodiment. At block 1005, the hierarchical time stamping logic 1000 can determine if the host identifier (e.g., Host ID) is enabled. If the host identifier is enabled at block 1005, the hierarchical time stamping logic 1000 can append the host identifier associated with the network element to the network data along with the timestamp, as shown at block 1006. In one embodiment, when the host identifier is enabled at block 1005, the hierarchical time stamping logic 1000 can append the time stamp and the host identifier in a single action.

After the time stamp and/or host identifier is appended to the network data payload or previously appended time stamps, at block 1007 the hierarchical time stamping logic 1000 can analyze the set of hierarchical time stamps to determine a latency value for between the network element and an additional network element, such as one or more of the upstream network elements from the perspective of the incoming network data.

Figure 11:
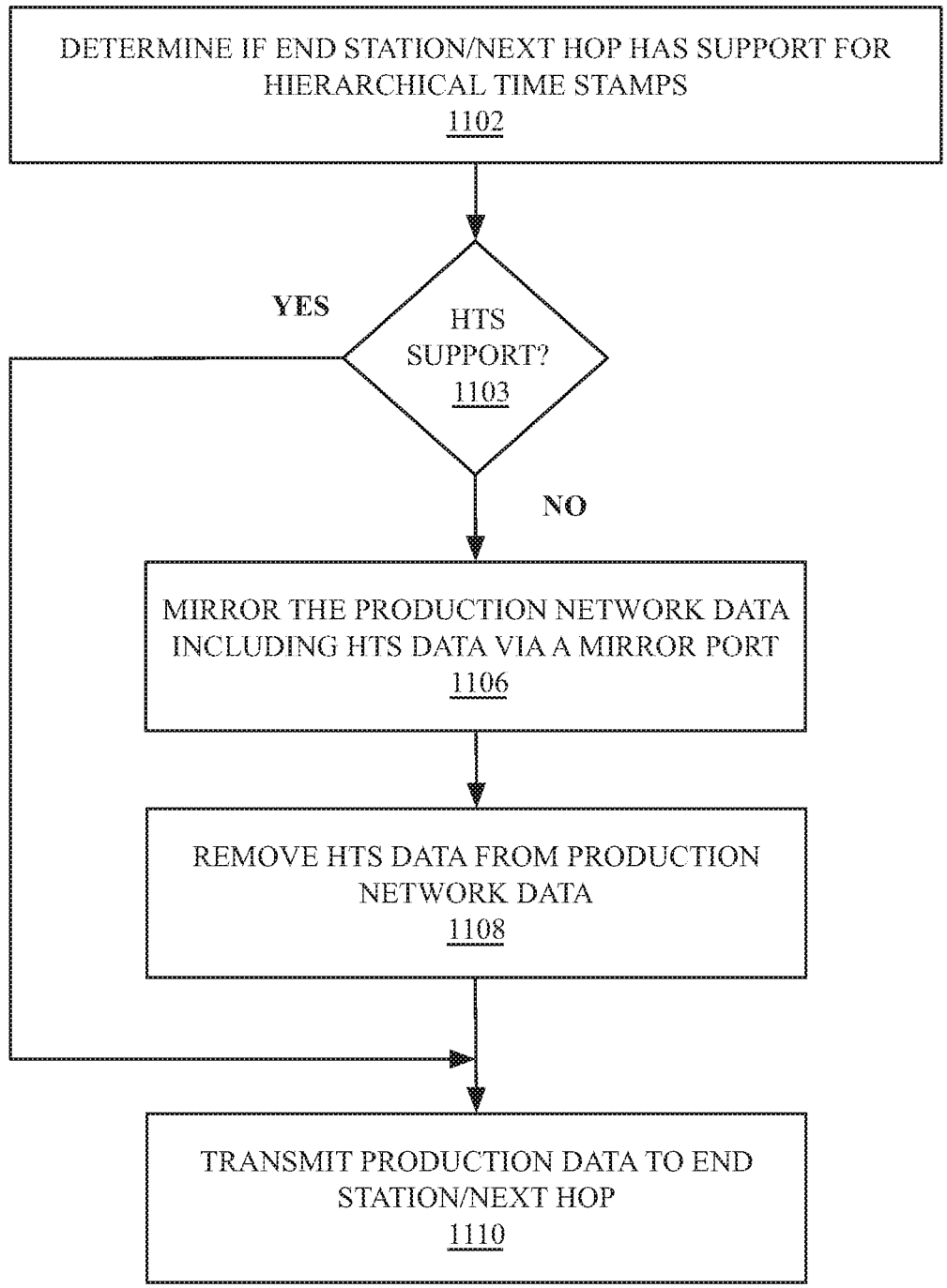
FIG. 11 is a flow diagram of mirroring logic for use with hierarchical time stamping, according to an embodiment.

FIG. 11 is a flow diagram of hierarchical time stamping mirroring logic 1100, according to an embodiment. In one embodiment, the hierarchical time stamping mirroring logic 1100 is applied when network data is to be forwarded to a host or network element without support for hierarchical time stamping or where a network element has otherwise been configured to mirror time stamped network data while forwarding the network data without the appended time stamps. The hierarchical time stamping mirroring logic 1100 can be implemented at least in part by a network processing ASIC, such as the ASIC 404 of FIG. 4, which includes a high precision timing unit 405.

At bock 1102, the hierarchical time stamping mirroring logic 1100 and determine if an end station or next hop to which the network data is to be forwarded supports or will otherwise receive network data having the hierarchical time stamps. If the end station or next hop is to receive times stamped data, as determined at block 1103, the hierarchical time stamping mirroring logic 1100 can transmit the production data to the end station or next hop at block 1110. If at block 1103 it is determined that the end station or next hop does not support or otherwise will not receive hierarchical time stamped network data, the hierarchical time stamping mirroring logic 1100 can mirror the production network data including the set of hierarchical time stamps via a mirror port, which is a port on a network element configured to transmit a copy of the network data that is to be transmitted from a specific port on the network element. Once the network data is mirrored at block 1106, the hierarchical time stamping mirroring logic 1100 can remove the hierarchical time stamp data from the production network data at block 1108 before the data is transmitted at block 1110.

Exemplary Data Processing System and Modular Network Element

Figure 12:
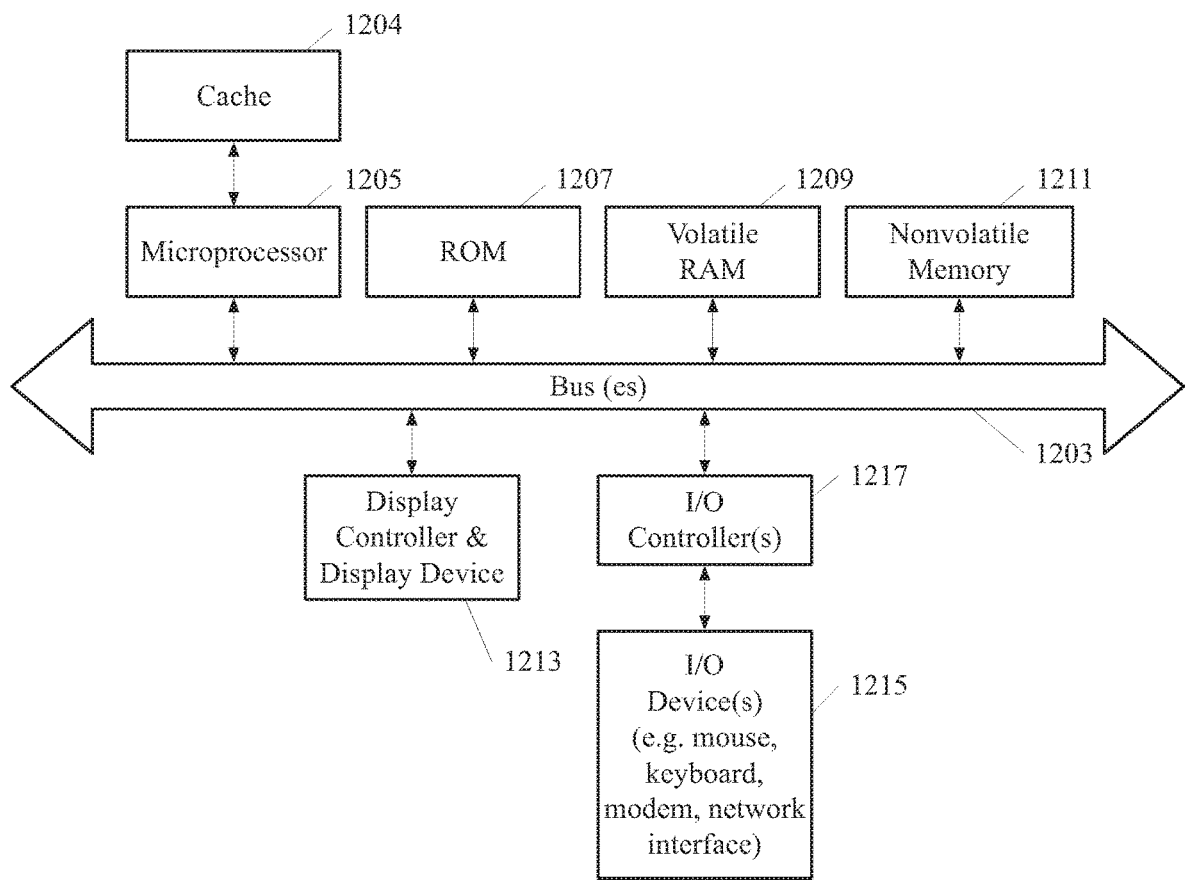
FIG. 12 shows one example of a data processing system, which may be used with one embodiment of the present invention.

FIG. 12 shows one example of a data processing system 1200, which may be used with one embodiment of the present invention. For example, the data processing system 1200 may be implemented including one or more of network element 100 as in FIG. 1 or network element 401 as in FIG. 4. In one embodiment, the data processing system 1200 is used within the control plane of a network element described herein. Note that while FIG. 12 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

The data processing system 1200 includes one or more bus(es) 1203 which couple to one or more microprocessor(s) 1205, ROM (Read Only Memory) 1207, volatile RAM 1209 and a non-volatile memory 1211. In one embodiment, the one or more microprocessor(s) 1205 couple to a cache 1204, which can include one or more sets of instruction and/or data caches. The bus(es) 1203 may include one or more buses connected to each other through various bridges, controllers and/or adapters as is well known in the art.

The microprocessor(s) 1205 may retrieve the instructions from the memories 1207, 1209, 1211 and execute the instructions to perform operations described above. Instructions and/or associated data retrieved from the memories 1207, 1209, 1211 may be stored in the cache 1204. The bus(es) 1203 interconnect system components with each other, and to a display controller and display device 1213, and to peripheral devices such as input/output (I/O) devices, which may be mice, keyboards, modems, network interfaces, printers and other devices well known in the art. Typically, the input/output devices 1215 are coupled to the system via input/output controller(s) 1217. The volatile RAM (Random Access Memory) 1209 is typically implemented as dynamic RAM (DRAM), which requires power continually in order to refresh or maintain the data in the memory, but may also include static ram (SRAM), which does not require a periodic refresh.

In one embodiment, the non-volatile memory 1211 is used at least in part as mass storage, which typically includes one or more of a magnetic hard drive, a magnetic optical drive, an optical drive, flash memory, or other types of memory systems, which maintain data after power is removed from the system. Typically, the mass storage portion of the non-volatile memory 1211 will also be a random access memory although this is not required. While FIG. 12 shows that the non-volatile memory 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 13:
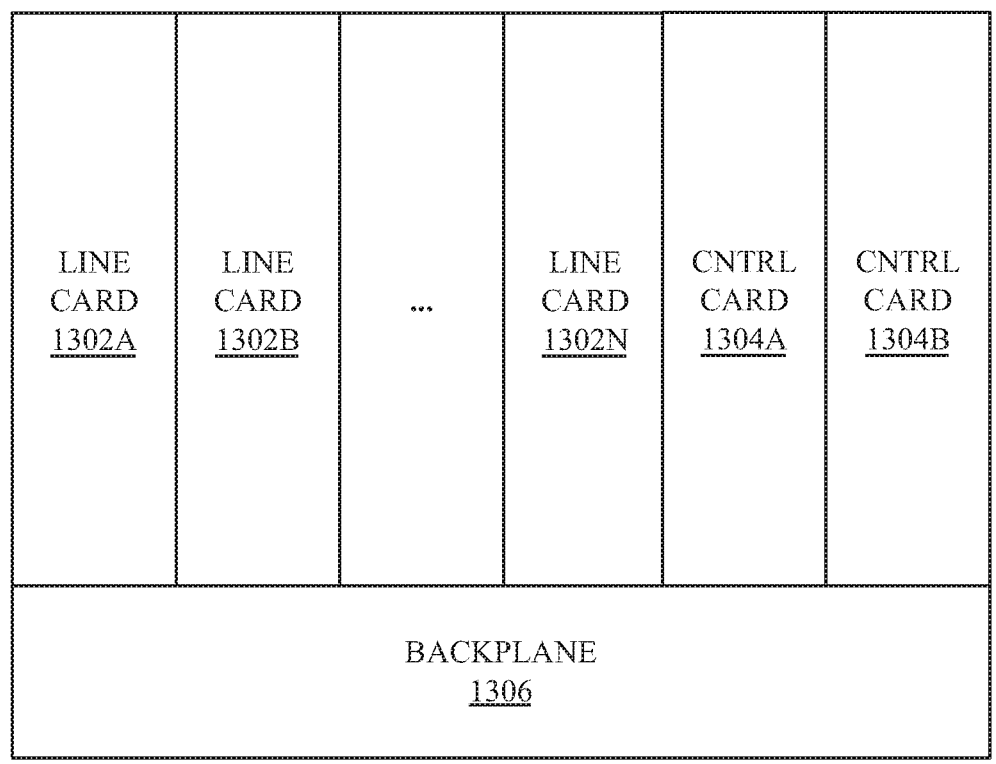
FIG. 13 is a block diagram of an additional embodiment of an exemplary network element as described herein.

FIG. 13 is a block diagram of an additional embodiment of an exemplary modular network element 1300 as described herein. In one embodiment, the network element has a modular and expandable configuration that allows the addition or removal of resources configured as line cards 1302A-N, or controller cards 1304A-B coupled to a backplane 1306. In one embodiment, the controller cards 1304A-B control the processing of the traffic by the line cards 1302A-N, which can each include one or more network data forwarding devices such as interfaces 106A-C as in FIG. 1, although the precise nature of the forwarding devices is not limited as such. In addition, the controller card 1304A-B can collect and possibly aggregate timing data as described in FIG. 12 above. In one embodiment, the line cards 1302A-N process and forward traffic according to the network policies received from controller cards the 1304A-B. In one embodiment, one or more of the line cards 1302A-N can monitor and report internal performance data, such as latency data for all or selected units of network data traversing the network element. In one embodiment, the controller cards 1304A-B can also be configured to perform all or a sub-set of functions provided by the line cards 1302A-N. It should be understood that the architecture of the network element 1300 illustrated in FIG. 13 is exemplary, and different combinations of cards may be used in other embodiments.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "receiving," "determining," "transmitting," "sending," "forwarding," "detecting," "gathering," "dropping," "communicating," "canceling," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description above. In addition, software aspects of the various embodiments are not described with reference to any particular programming language. It will be appreciated that a variety of programming languages may be used to implement the teachings described herein.

In the description above and in the claims below, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the terms "server," "client," and "device" are intended to refer generally to data processing systems rather than specifically to a particular form factor for the server, client, and/or device.

Specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform operations comprising the element of the method, or of an apparatus or system according to embodiments and examples described herein. Additionally various components described herein can be a means for performing the operations or functions described in accordance with an embodiment.

One embodiment provides for a network element including a network port to receive production network data that is used for purposes other than testing the performance of a network; a data plane coupled to the network port, the data plane including a timing module to append a time stamp to a set of one or more time stamps included within the production network data; and a control plane coupled to the data plane, the control plane including a latency analyzer to analyze the set of one or more time stamps included within the production network data. Other embodiments include corresponding computer systems, apparatus, and computer programs recorded on one or more computer storage devices, each configured to perform the actions of the methods.

Implementations may include one or more of the following features. One embodiment provides for a network element where the timing module is a hardware timing module having an accuracy of at least 10 nanoseconds. In one embodiment the timing module is included within an integrated circuit of the data plane. The integrated circuit of the data plane can append the time stamp to production network data after the production network data is received at a media access control (MAC) unit of the integrated circuit. The network element data plane can be configured to append the time stamp to the set of one or more time stamps on the network data in a hierarchical manner. The set of one or more time stamps can include a time stamp for each network element traversed by a unit of production data. In one embodiment each timestamp includes between 36-bits and 48-bits of timing precision.

One embodiment provides for a network element where a latency analyzer of the control plane is to analyze the set of one or more time stamps to determine a node-to-node latency of production network data. The data plane of the network element can apply a host identifier in conjunction with the time stamp, where the host identifier uniquely identifies the network element within the production network. In one embodiment the control plane additionally includes a path analyzer to determine the path of the production network data based on a set of host identifiers included with the set of time stamps. Each host identifier may be between 8 bits and 16 bits in length. In one embodiment the data plane is further to append the time stamp to the set of one or more time stamps at a data rate of the network port. The data rate of the network port can be one or more of 40 gigabits per second or 100 gigabits per second.

One embodiment provides for a non-transitory machine-readable medium storing instructions to cause one or more processing units of a network element to perform operations comprising receiving production network data at a network port of the network element, wherein the production network data is used for purposes other than testing the performance of a network; appending a hierarchical time stamp to any existing a set of one or more hierarchical time stamps within the production network data; and analyzing the set of one or more time stamps included within the production network data using control plane logic of the network element to determine a latency between the network element and an additional network element on the network.

One embodiment provides for a network system comprising a set of network elements to interconnect a set of host devices, each network element in the set of network elements to append a time stamp to a unit of production network data received at the network element, the time stamp appended in a hierarchical manner to any existing set of timestamps on the unit of production network data. In a further embodiment the set of network elements includes a first network element to receive a unit of production network data, the first network element to apply a first time stamp to the unit of network data, the first time stamp including a coordinated universal time value; a second network element to receive the unit of production network data from the first network element, the second network element to append a second time stamp to the first time stamp; and a third network element to receive the unit of production network data from the second network element, where the third network element is to append a third time stamp to the second time stamp.

In a further embodiment the second network element includes a latency analyzer to determine a first latency between the first network element and the second network element using the first and second time stamp and the third network element includes a latency analyzer to determine a second latency between the second network element and the third network element using the second and third time stamp. In one embodiment at least one network element in the set of network elements is further to include a host identifier to associate the network element with the time stamp.

In one embodiment each network element is configured to transmit latency or time stamp data to a latency data aggregator. The latency data aggregator may be included in a network management device having a network management module to monitor and configure the set of network elements. The latency data aggregator can be configured to analyze latency data from the network elements to provide path specific latency data for a region of the network. Implementations of the described techniques may include hardware, a method or process, or computer software on a computer-accessible medium.

While the foregoing discussion describes exemplary embodiments of the present invention, one skilled in the art will recognize from such discussion, the accompanying drawings, and the claims, that various modifications can be made without departing from the spirit and scope of the invention. Therefore, the illustrations and examples herein should be construed in an illustrative, and not a restrictive sense. The scope and spirit of the invention should be measured solely by reference to the claims that follow.

What is claimed is:

1. A network element comprising:
    a network physical port to receive, via a production network, production network data that is used for purposes other than testing the performance of a network, wherein the production network data includes a plurality of units of production network data having different protocols and traveling over a plurality of different paths to the network element;
    a data plane coupled to the network port, the data plane including a timing module to append a time stamp to a plurality of time stamps included within each unit of the production network data; and
    a control plane coupled to the data plane, the control plane implemented with circuitry and including a latency analyzer to determine a latency for each unit of production network data based on at least the plurality of time stamps and a path analyzer to determine a path corresponding to the latency for each unit of production network data based on a set of host identifiers included with the plurality of time stamps.

2. The network element as in claim 1, wherein the timing module is a hardware timing module having an accuracy of at least 10 nanoseconds.

3. The network element as in claim 2, wherein the timing module is included within an integrated circuit of the data plane.

4. The network element as in claim 3, wherein the integrated circuit of the data plane is to append the time stamp to the production network data after the production network data is received at a media access control (MAC) unit of the integrated circuit.

5. The network element as in claim 1, wherein the data plane is to append the time stamp to the set of one or more time stamps in a hierarchical manner and the set of one or more time stamps includes a time stamp for each network element traversed by a unit of production data.

6. The network element as in claim 5, wherein each timestamp includes between 36-bits and 48-bits of timing precision.

7. The network element as in claim 6, wherein each timestamp includes 48-bits of timing precision.

8. The network element as in claim 5, wherein the latency analyzer of the control plane is to analyze the set of one or more time stamps to determine a node-to-node latency of the production network data.

9. The network element as in claim 5, wherein the data plane is to include a host identifier with the time stamp, the host identifier to uniquely identify the network element within the production network.

10. The network element as in claim 9, wherein each host identifier is between 8 bits and 16 bits in length.

11. The network element as in claim 1, wherein the data plane is further to append the time stamp to the set of one or more time stamps at a data rate of the network port.

12. The network element as in claim 11, wherein the data rate of the network port is one or more of 40 gigabits per second or 100 gigabits per second.

13. A non-transitory machine-readable medium storing instructions to cause one or more processing units of a network element to perform operations comprising:
    receiving production network data at a network port of the network element, wherein the production network data is used for purposes other than testing the performance of a network and the production network data includes a plurality of units of production network data having different protocols and traveling over a plurality of different paths to the network element;
    appending a time stamp to a plurality of hierarchical time stamps within each unit of the production network data; and
    analyzing the plurality of hierarchical time stamps included within the production network data using control plane logic of the network element to determine a latency for each unit of production network data and to determine a path corresponding to the latency for each unit of the production network data based on a set of host identifiers included with the plurality of time stamps.

14. The non-transitory machine-readable medium as in claim 13, the operations additionally comprising including a host identifier associated with network element with the time stamp.

15. The non-transitory machine-readable medium as in claim 14, wherein the host identifier is between 8 bits and 16 bits in length.

16. The non-transitory machine-readable medium as in claim 15, wherein each time stamp includes between 36-bits and 48-bits of timing precision.

17. The non-transitory machine-readable medium as in claim 16, wherein each time stamp includes 48-bits of timing precision.

18. The non-transitory machine-readable medium as in claim 17, the operations additionally comprising initializing a timing module of a data plane of the network element with a coordinated universal time value, wherein appending the time stamp to the set of one or more hierarchical time stamps includes appending the coordinated universal time value to the production network data.

19. The non-transitory machine-readable medium as in claim 13, the operations further comprising:
    creating a mirror of the production network data including the set of one or more hierarchical time stamps;

removing the set of one or more hierarchical time stamps from the production network data;

transmitting the production network data to an end station coupled to the network element; and transmitting the mirror of the production network data via a mirror port of the network element.

20. A network system comprising:

a set of network elements to interconnect a set of host devices on a network, each network element in the set of network elements to append a time stamp to each received unit of production network data received at the network element, the time stamp appended in a hierarchical manner to any existing set of timestamps on the unit of production network data, wherein the production network data includes a plurality of units of production network data having different protocols and traveling over a plurality of different paths to the network element; and a network management device, coupled to the set of network elements through a physical port of the network management device via the network, having a network management module to monitor and configure the set of network elements, the network management module including a latency data aggregator that determines latencies for multiple paths in the network between different pairs of ingress, egress network elements selected from the set of network elements.

21. The network system as in claim 20, wherein the set of network elements includes:

a first network element to receive a unit of production network data, the first network element to apply a first time stamp to the unit of production network data, the first time stamp including a coordinated universal time value;

a second network element to receive the unit of production network data from the first network element, the second network element to append a second time stamp to the first time stamp; and a third network element to receive the unit of production network data from the second network element, the third network element to append a third time stamp to the second time stamp.

22. The network system as in claim 21, wherein the set of network elements includes one or more network elements including a latency analyzer to determine a latency data using the set of timestamps on the unit of production network data.

23. The network system as in claim 22, wherein the set of network elements additionally includes one or more network elements configured to transmit time stamps or latency data to the latency data aggregator of the network management device.

24. The network system as in claim 22, wherein the latency data aggregator is to analyze latency data from the network elements to provide path specific latency data for a region of the network.

* * * * *